United States Patent
Eftekhari et al.

(10) Patent No.: US 10,769,554 B2
(45) Date of Patent: Sep. 8, 2020

(54) INTERACTIVE TECHNIQUE FOR USING A USER-PROVIDED IMAGE OF A DOCUMENT TO COLLECT INFORMATION

(75) Inventors: Amir Eftekhari, San Diego, CA (US); Alan Tifford, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 515 days.

(21) Appl. No.: 13/195,298

(22) Filed: Aug. 1, 2011

(65) Prior Publication Data

US 2013/0036347 A1 Feb. 7, 2013

(51) Int. Cl.
*G06F 17/30* (2006.01)
*G06Q 10/00* (2012.01)
*G06Q 40/00* (2012.01)
*G06F 40/174* (2020.01)

(52) U.S. Cl.
CPC .......... *G06Q 10/00* (2013.01); *G06F 40/174* (2020.01); *G06Q 40/00* (2013.01)

(58) Field of Classification Search
CPC .................................................. G06Q 40/123
USPC ....................................................... 715/222
See application file for complete search history.

(56) References Cited

U.S. PATENT DOCUMENTS

| | | | |
|---|---|---|---|
| 6,991,158 B2 * | 1/2006 | Munte | 235/379 |
| 8,024,269 B1 * | 9/2011 | Ballard | 705/40 |
| 8,156,018 B1 * | 4/2012 | Quinn et al. | 705/31 |
| 8,204,805 B2 * | 6/2012 | Eftekhari et al. | 705/31 |
| 2006/0155618 A1 * | 7/2006 | Wyle | 705/31 |
| 2007/0009158 A1 | 1/2007 | Geva | |
| 2007/0133876 A1 | 6/2007 | Chande et al. | |
| 2009/0183064 A1 | 7/2009 | Borgaonkar | |
| 2010/0161460 A1 | 6/2010 | Vroom | |
| 2011/0197119 A1 * | 8/2011 | Ye | G06Q 30/08 715/226 |
| 2012/0027246 A1 * | 2/2012 | Tifford | G06Q 40/00 382/100 |
| 2012/0167047 A1 * | 6/2012 | Wyler et al. | 717/122 |

OTHER PUBLICATIONS

"Instructions for the 2009 Diversity Immigrant Visa Program (DV-2009)", 2009, U.S. State Department, pp. 1-16.*
McCauley, "Android App—CamScanner," Mar. 6, 2011. http://lfmccauley.blogspot.com/2011/03/android-app-camscanner.html.*

* cited by examiner

*Primary Examiner* — Maikhanh Nguyen
(74) *Attorney, Agent, or Firm* — Patterson + Sheridan, LLP

(57) ABSTRACT

In a collection technique, a user (such as a taxpayer) provides information (such as income-tax information) by submitting an image of a document, such as an income-tax summary or form. In particular, the user may provide a description of the document. In response, the user is prompted for the information associated with the field in the document. Then, the user provides the image of a region in the document that includes the field. Based on the image, the information is extracted, and the field in the form is populated using the extracted information. The prompting, receiving, extracting and populating operations may be repeated for one or more additional fields in the document.

16 Claims, 7 Drawing Sheets

INTERACTIVE TECHNIQUE FOR USING A USER-PROVIDED IMAGE OF A DOCUMENT TO COLLECT INFORMATION

BACKGROUND

The present disclosure relates to techniques for collecting information from a user.

Existing software programs often collect information either directly or indirectly from users. For example, in existing income-tax programs, which facilitate income-tax preparation, a user may provide income-tax information from forms (such as a W-2 form) by typing it in manually. Alternatively, the user may provide credential information (such as a user name and password) that allows the income-tax information to be downloaded from a payroll company's server. However, this indirect collection technique is not available for many users.

Manually providing income-tax information is a time-consuming and laborious process. Furthermore, because users don't know which data on a given form is relevant, they often provide all the information on the form, which results in wasted effort. In addition, manually provided income-tax information often contains errors that can cause mistakes in users' income-tax returns. However, requiring users to validate all of the data they have provided (such as all of the fields in a W-2 form) is also a time-consuming and laborious process, and the user may not detect all of the errors.

As a consequence, manual entry of information can adversely impact the user experience, and can result in errors. Consequently, manual entry can reduce: customer satisfaction, customer retention, and sales of software programs.

SUMMARY

The disclosed embodiments relate to an electronic device that populates a field in a form. During operation, the electronic device receives a description of a document from a user. In response, the electronic device prompts the user for information associated with a field in the document. Then, the electronic device receives an image of a region in the document that includes the field from the user. Moreover, the electronic device extracts the information from the image of the region, and populates the field in the form based on the extracted information.

Note that the document may include an income-tax form. More generally, the document includes a form having an official format, such as that specified by a business or a government agency. However, in some embodiments the document is an arbitrary document (and may not have a predefined format).

Moreover, when prompting the user, the electronic device may display a template of fields in the document and request that the user provide the image of the field.

Furthermore, the image may include a digital photograph. Alternatively, the image may include a real-time video stream provided by an imaging device.

In some embodiments, the image includes multiple fields and, when extracting the information, the electronic device may: capture a set of information associated with the fields; identify the field based on descriptive information proximate to the field; and select a subset of the set of information that includes the information. Note that, if the computer is unable to identify the field, the electronic device may prompt the user to identify the field from the multiple fields.

Additionally, extracting the information may involve optical character recognition. For example, the optical character recognition may include a radial image analysis technique that identifies a boundary of the field in the region.

In some embodiments, the electronic device repeats the prompting, receiving, extracting and populating operations for one or more additional fields in the document.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for populating a field in a form, and a computer-program product (e.g., software) for use with the electronic device are described. This collection technique allows a user (such as a taxpayer) to provide information (such as income-tax information) by submitting an image of a document, such as an income-tax summary or form. In particular, the user may provide a description of the document. In response, the user is prompted for the information associated with the field in the document. Then, the user provides the image of a region in the document that includes the field. Based on the image, the information is extracted, and the field in the form is populated using the extracted information. The prompting, receiving, extracting and populating operations may be repeated for one or more additional fields in the document.

By facilitating collection of the information, this collection technique may make it easier for users to accurately and efficiently complete forms. For example, in income-tax programs, the user may not have to manually provide the income-tax information. Alternatively, the user may only have to validate a subset of the income-tax information (as opposed to all of the income-tax information). This capability may: reduce mistakes in completing the forms (such as those associated with income-tax returns), increase sales, improve customer satisfaction and/or increase customer retention.

In the discussion that follows, the users may include a variety of entities, such as: an individual, an organization, a business and/or a government agency. Furthermore, a 'business' should be understood to include: for-profit corporations, non-profit corporations, organizations, groups of individuals, sole proprietors, government agencies, partnerships, etc.

Figure 1:
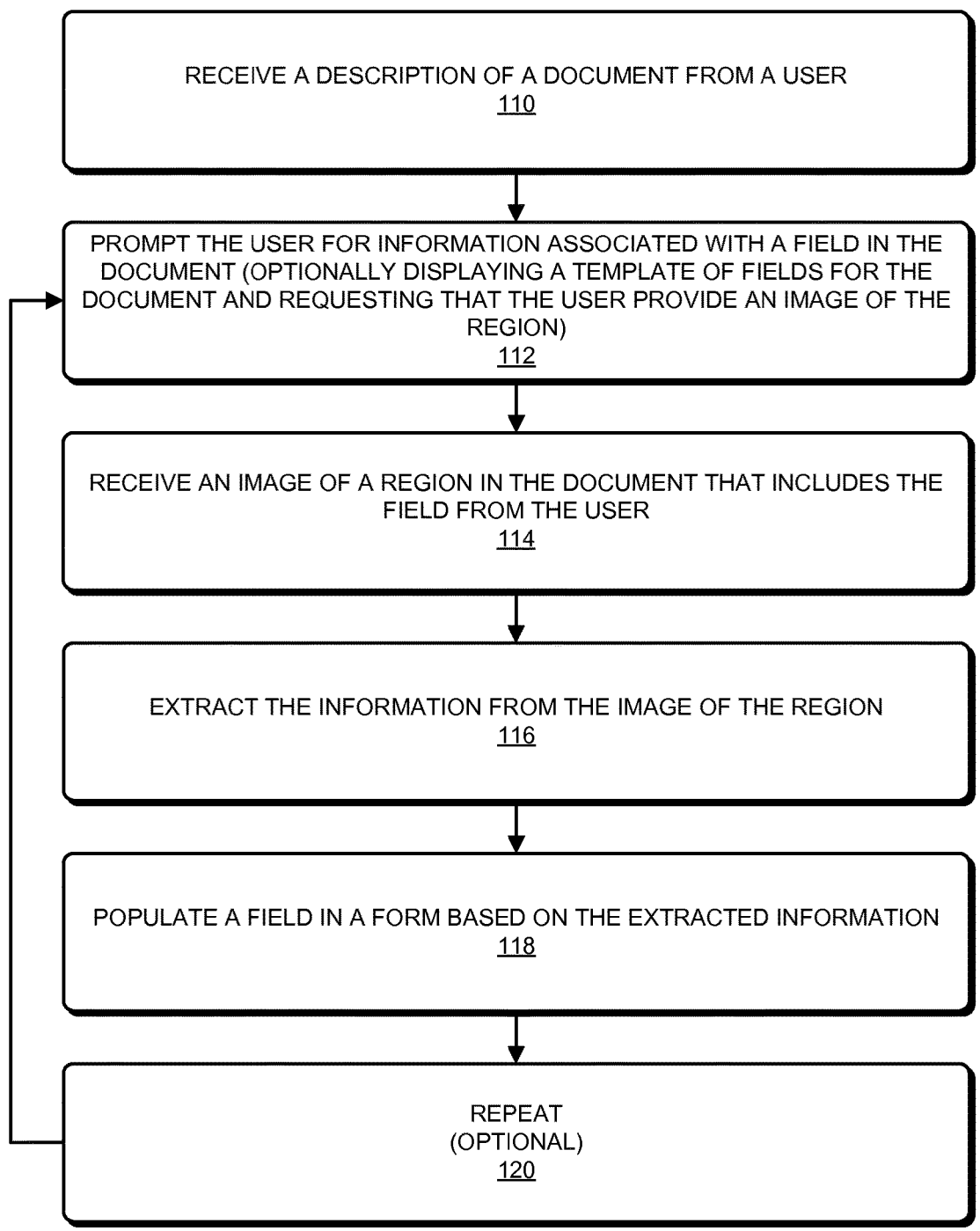
FIG. 1 is a flow chart illustrating a method for populating a field in a form in accordance with an embodiment of the present disclosure.

We now describe embodiments of the collection technique. FIG. 1 presents a flow chart illustrating a method 100 for populating a field in a form, which may be performed by an electronic device, such as electronic device 500 in FIG. 5. During operation, the electronic device receives a description of a document from a user (operation 110). This may involve the user specifying the document, for example, by selecting a document name or number from a list of predefined documents. Note that the document may include an income-tax form that includes a summary of the income-tax information of the user during a time interval (such as a quarter or a year). For example, the document may include a W-2 form. More generally, the document includes a form having an official format, such as that specified by a business or a government agency. However, in some embodiments the document is an arbitrary document (and may not have a predefined format), such as a handwritten note.

In response, the electronic device prompts the user for information (such as the user's name, address, phone number, a dollar amount, etc.) associated with a field in the document (operation 112). For example, when prompting the user, the electronic device may display a template of fields in the document and may request that the user provide the image of the field.

Then, the electronic device receives an image of a region in the document that includes the field from the user (operation 114). Furthermore, the image may include a digital photograph, such as an image that is captured using an imaging device (such as a digital camera) on a portable electronic device (e.g., a cellular telephone). Alternatively, the image may include a real-time video stream provided by the imaging device. (Thus, in some embodiments the user need not take a permanent picture of the region. Instead, the imaging device may be used in a 'video mode' to provide a continuously updated image.)

Moreover, the electronic device extracts the information from the image of the region (operation 116), and populates the field in the form based on the extracted information (operation 118). In this way, the electronic device can be used as a field-by-field scanner. Moreover, the collection technique can, therefore, reduce or eliminate the need for the user to manually enter the information.

Note that extracting the information may involve optical character recognition or OCR (such as FlexiCapture OCR software from ABBYY Software House, Inc. of Moscow, Russia) and/or intelligent character recognition. For example, the optical character recognition may include a radial image analysis technique that identifies a boundary of the field in the region. Furthermore, in some embodiments an accelerometer or a position sensor in the electronic device is used to determine the field in the document in which the user is interested.

In some embodiments, the electronic device optionally repeats (operation 120) the prompting, receiving, extracting and populating operations for one or more additional fields in the document.

In some embodiments, the image includes multiple fields and, when extracting the information, the electronic device may: capture a set of information associated with the fields; identify the field based on descriptive information adjacent or proximate to the field; and select a subset of the set of information that includes the information. For example, the information adjacent or proximate to the field may include a text description of the field. Note that, if the computer is unable to identify the field, the electronic device may prompt the user to identify the field from the multiple fields.

Figure 2A:
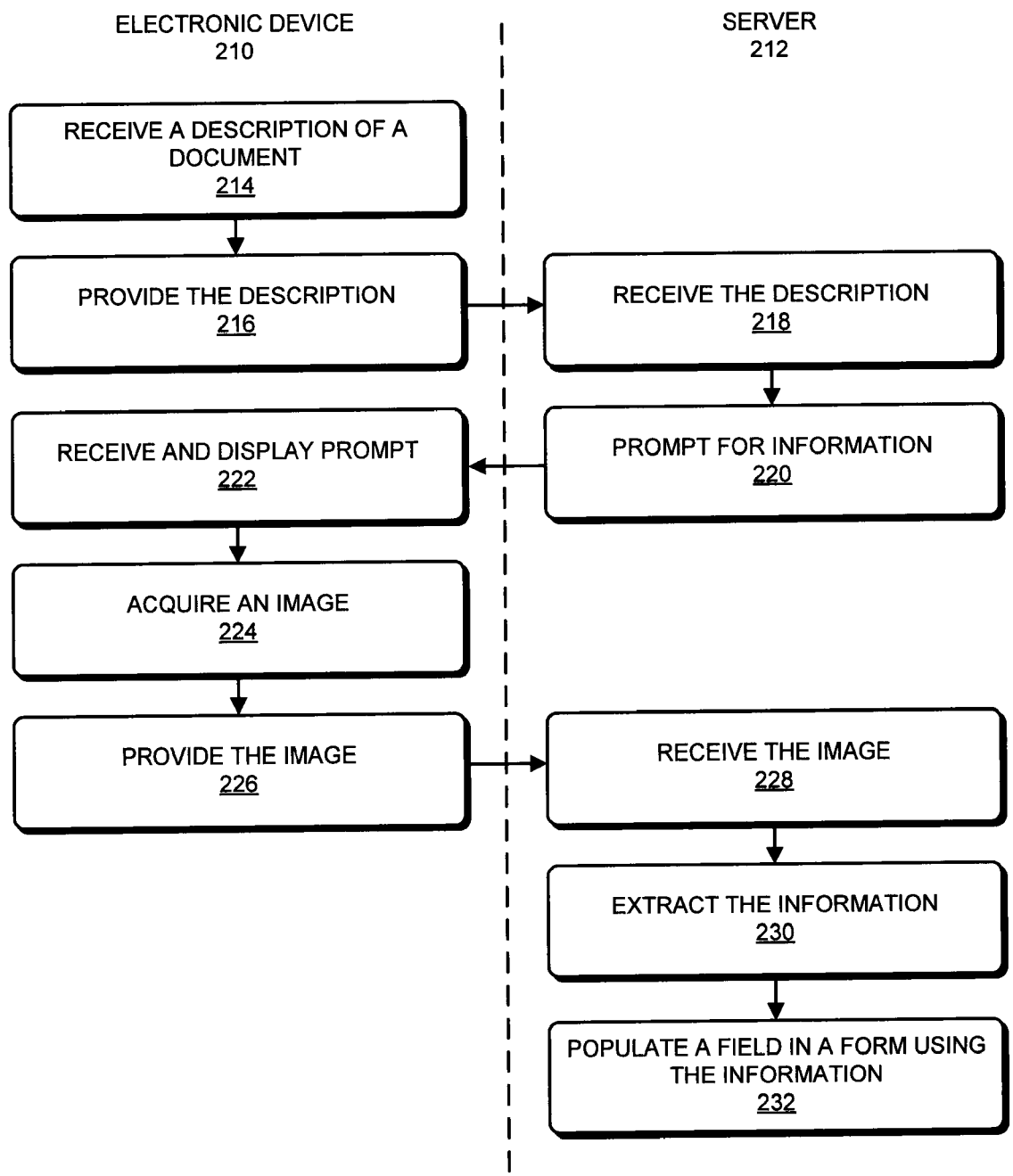
FIG. 2A is a flow chart illustrating the method of FIG. 1 in accordance with an embodiment of the present disclosure.

In an exemplary embodiment, the collection technique is implemented using an electronic device (such as a client computer or a portable electronic device) and at least one server, which communicate through a network, such as the Internet (i.e., using a client-server architecture). This is illustrated in FIG. 2A, which presents a flow chart illustrating method 100. During this method, a user may provide a description of a document that is received by electronic device 210 (operation 214). This description may be subsequently provided to (operation 216) and received by server 212 (operation 218). In response, server 212 may prompt the user for information associated with a field in the document (operation 220). This prompt may be received and displayed by electronic device 210 (operation 222).

Then, the user may use electronic device 210 to acquire an image of a region in the document that includes the field (operation 224), for example, using a digital camera included in electronic device 210. This image may be provided to (operation 226) and received by server 212 (operation 228).

Server 212 may extract the information from the image of the region (operation 230), and may populate the field in the form based on the extracted information (operation 232).

Figure 2B:
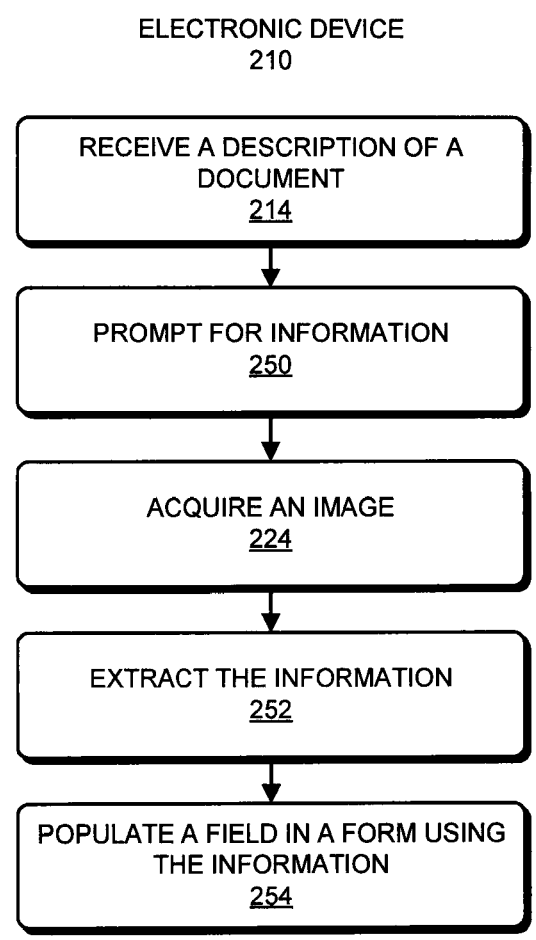
FIG. 2B is a flow chart illustrating the method of FIG. 1 in accordance with an embodiment of the present disclosure.

Alternatively, in another exemplary embodiment, the collection technique is implemented using an electronic device (such as a client computer or a portable electronic device). This is illustrated in FIG. 2B, which presents a flow chart illustrating method 100. During this method, a user may provide a description of a document that is received by electronic device 210 (operation 214). In response, electronic device 210 may prompt the user for information associated with a field in the document (operation 250). For example, electronic device 210 may display the prompt on a display associated with electronic device 210.

Then, the user may use electronic device 210 to acquire an image of a region in the document that includes the field (operation 224), for example, using a digital camera included in electronic device 210.

Electronic device 210 may extract the information from the image of the region (operation 252), and may populate the field in the form based on the extracted information (operation 254).

In some embodiments of method 100 (FIGS. 1, 2A and 2B), there may be additional or fewer operations. Moreover, the order of the operations may be changed, and/or two or more operations may be combined into a single operation.

In an exemplary embodiment, the user indicates that the document is a W-2 form. In response, the user is prompted to provide the information in Box 1 ('Wages, tips, other compensation').

Figure 3:
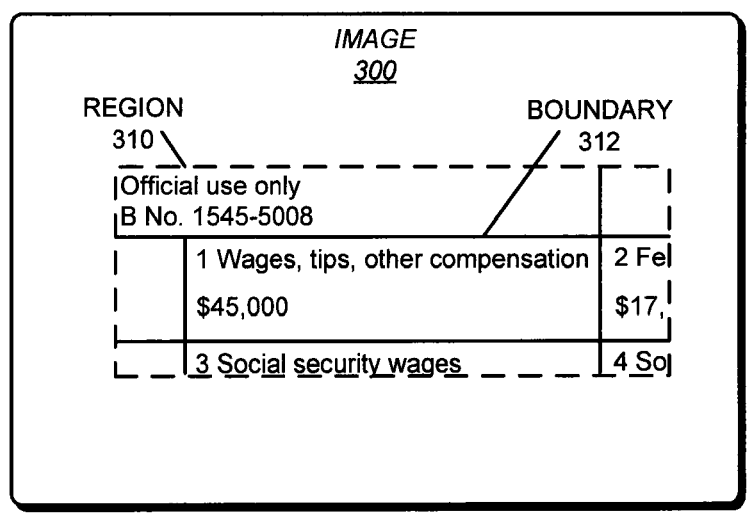
FIG. 3 is a block diagram illustrating extraction of information from an image of a region in a document in accordance with an embodiment of the present disclosure.

Based on the prompt, the user takes a picture of a region on the W-2 form that includes Box 1. The information is extracted from the picture using OCR. As shown in FIG. 3, which illustrates extraction of information (i.e., '$45,000') from an image 300 of a region 310 in a document, this may involve a radial image analysis technique that identifies a boundary 312 of Box 1 in region 310. For example, in the radial image analysis technique boundary 312 may be identified by starting at a center or internal location inside of boundary 312 and radially moving outward until a meaningful perimeter (i.e., boundary 312) is found (such as a whitespace, a line, etc.).

Once boundary 312 is identified, image 300 may be cropped and fed into an OCR engine to extract the information. Next, a field in an income-tax form may be populated with the extracted information.

Figure 4:
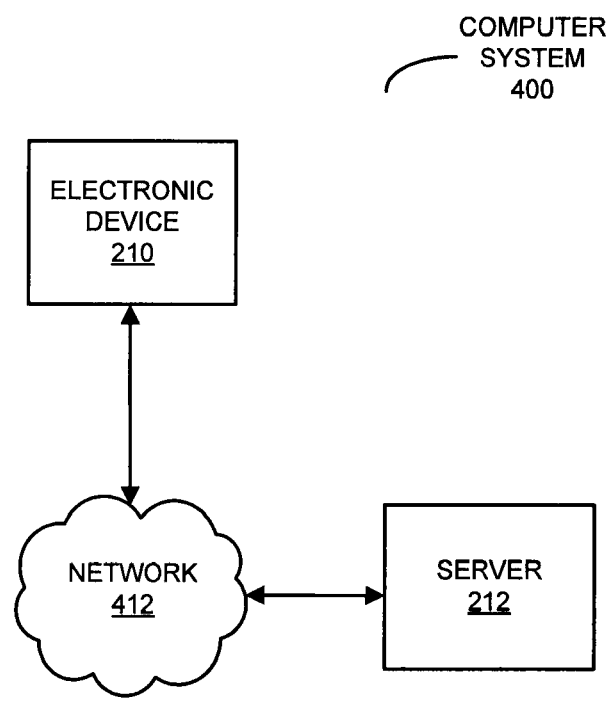
FIG. 4 is a block diagram illustrating a computer system that performs the method of FIG. 1 in accordance with an embodiment of the present disclosure.

We now describe embodiments of the electronic device and the computer system and their use. FIG. 4 presents a block diagram illustrating a computer system 400 that performs method 100 (FIGS. 1, 2A and 2B). In this system, a user of electronic device 210 may use a software program or software, such as income-tax software. This software may be a stand-alone application or a portion of another application that is resident on and which executes on electronic device 210 (such as financial software that is provided by server 212 or that is installed and which executes on electronic device 210).

In some embodiments, at least a portion of the software may be an application tool that is embedded in the web page (and which executes in a virtual environment of the web browser). In an illustrative embodiment, the application tool is a software package written in: JavaScript™ (a trademark of Oracle Corporation), e.g., the application tool includes programs or procedures containing JavaScript instructions, ECMAScript (the specification for which is published by the European Computer Manufacturers Association International), VBScript™ (a trademark of Microsoft Corporation) or any other client-side scripting language. In other words, the embedded application tool may include programs or procedures containing: JavaScript, ECMAScript instructions, VBScript instructions, or instructions in another programming language suitable for rendering by the web browser or another client application (such as on electronic device 210). Thus, the application tool may be provided to the user via a client-server architecture. In particular, instructions for the web page may be provided by server 212 to electronic device 210 via network 412.

As discussed previously, the user may provide a description of a document to the software on electronic device 210. In response, the software may prompt the user for information associated with a field in the document, for example, based on a stored template of the fields in the document.

Then, the user may use electronic device 210 to take an image of a region in the document that includes the field, for example, using a digital camera included in electronic device 210.

Next, the software may extract the information from the image of the region (for example, using an extraction engine or module, such as an OCR engine), and may populate the field in the form based on the extracted information.

Note that the information in computer system 400 (such as predefined templates for income-tax return forms) may be stored at one or more locations in computer system 400 (i.e., locally or remotely). Moreover, because this information may be sensitive in nature, it may be encrypted. For example, stored information and/or information communicated via network 412 may be encrypted.

Figure 5:
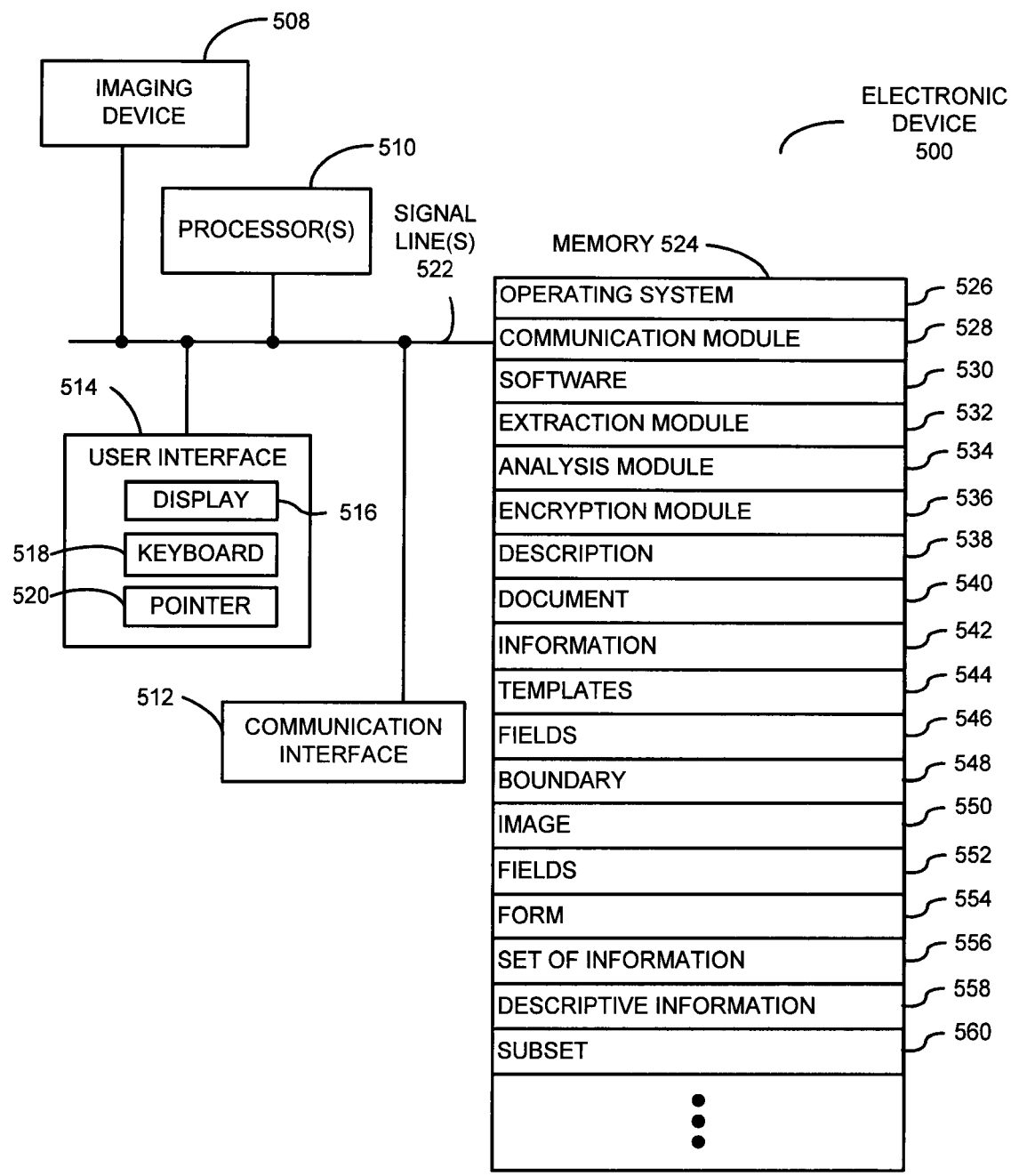
FIG. 5 is a block diagram illustrating an electronic device that performs the method of FIG. 1 in accordance with an embodiment of the present disclosure.

FIG. 5 presents a block diagram illustrating an electronic device 500 that performs method 100 (FIGS. 1, 2A and 2B), such as electronic device 210 (FIGS. 2A, 2B and 4). Electronic device 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516 (such as a touch-sensitive display), a keyboard 518, and/or a pointer 520, such as a mouse.

Memory 524 in electronic device 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to electronic device 500.

Memory 524 may also include multiple program modules (or sets of instructions), including: software 530 (or a set of instructions), extraction module 532 (or a set of instructions), analysis module 534 (or a set of instructions), and/or encryption module 536 (or a set of instructions). Note that one or more of these program modules (or sets of instructions) may constitute a computer-program mechanism.

During method 100 (FIG. 1), the user may provide a description 538 of a document 540. In response, software 530 may prompt the user for information 542 associated with a field (such as one of fields 546) in document 540. For example, when prompting the user, software 530 may display one of templates 544 of fields 546 in document 540 on display 516 and may request that the user provide an image of the field.

Figure 6:
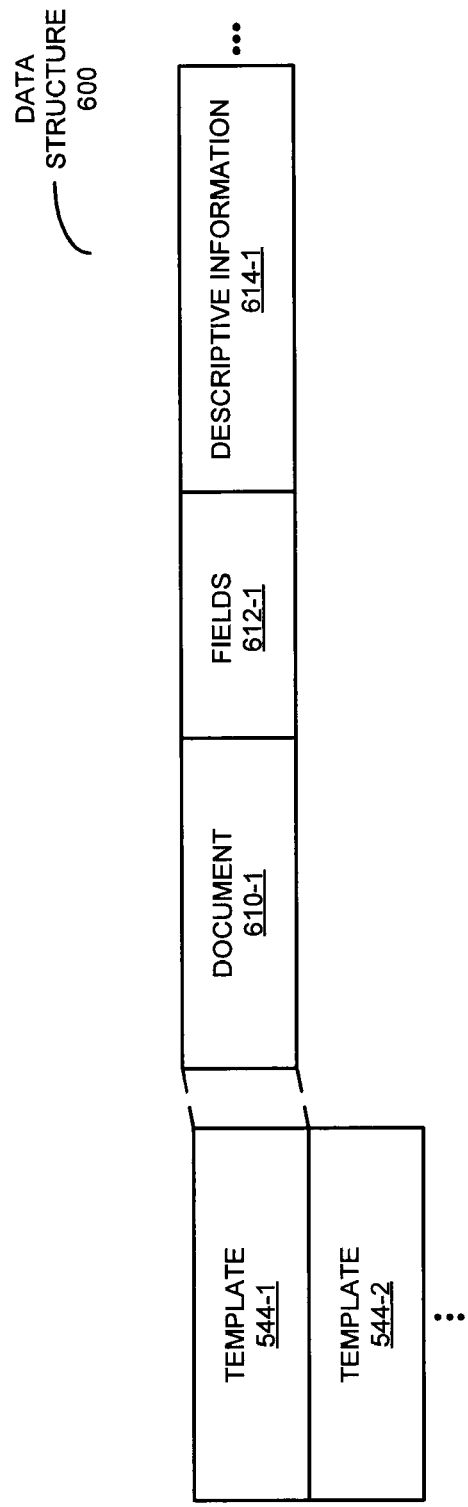
FIG. 6 is a block diagram illustrating a data structure for use in the electronic device of FIG. 5 in accordance with an embodiment of the present disclosure.

An example of stored templates 544 is shown in FIG. 6, which presents a data structure 600. In particular, data structure 600 may include templates 544. For example, template 544-1 may include: a document 610-1 (such as a form), fields 612-1, and/or associated descriptive information 614-1 that is adjacent or proximate to fields 612-1 in document 610-1.

Referring back to FIG. 5, based on the prompt the user may acquire an image 550 of a region in document 540 that includes the field using an imaging device 508. Next, extraction module 532 may extract information 542 from image 550 of the region, and software 530 may populate one or more fields 552 in form 554 based on extracted information 542. Note that extracting information 542 may involve OCR, intelligent character recognition and/or a radial image analysis technique that identifies a boundary 548 of the field in the region.

In some embodiments, image 550 includes multiple fields 546 and, when extracting the information, electronic device 500 may capture a set of information 556 associated with fields 546. Then, analysis module 534 may identify the field based on descriptive information 558 adjacent or proximate to the field, and may select a subset 560 of set of information 556 that includes information 542. Note that, if analysis module 534 is unable to identify the field, software 530 may prompt the user to identify the field from fields 546.

Furthermore, because information 542 may be sensitive in nature, in some embodiments at least some of the information stored in memory 524 and/or at least some of the information communicated using communication module 528 is encrypted using encryption module 536. Additionally, in some embodiments one or more of the modules in memory 524 may be included in software 530.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although electronic device 500 is illustrated as having a number of discrete items, FIG. 5 is intended to be a functional description of the various features that may be present in electronic device 500 rather than a structural schematic of the embodiments described herein. In practice, and as recognized by those of ordinary skill in the art, the functions of electronic device 500 may be distributed over a large number of servers or computers, with various groups of the servers or computers performing particular subsets of the functions. In some embodiments, some or all of the functionality of electronic device 500 may be implemented in one or more application-specific integrated circuits (ASICs) and/or one or more digital signal processors (DSPs).

Electronic devices and servers in computer system 400 (FIG. 4) and/or electronic device 500 may include one of a variety of devices capable of manipulating computer-readable data or communicating such data between two or more computing systems over a network, including: a personal computer, a laptop computer, a mainframe computer, a portable electronic device (such as a cellular phone or PDA), a server, a tablet computer, and/or a client computer (in a client-server architecture). Moreover, network 412 (FIG. 4) may include: the Internet, World Wide Web (WWW), an intranet, LAN, WAN, MAN, or a combination of networks, or other technology enabling communication between computing systems.

In exemplary embodiments, software 530 includes financial software, such as: Quicken™ and/or TurboTax™ (from Intuit, Inc., of Mountain View, Calif.), Microsoft Money™ (from Microsoft Corporation, of Redmond, Wash.), Splash-Money™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include: Quick-Books™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Image 300 (FIG. 3), computer system 400 (FIG. 4), and/or electronic device 500 may include fewer components or additional components. Moreover, two or more components may be combined into a single component, and/or a position of one or more components may be changed. In some embodiments, the functionality of computer system 400 (FIG. 4) and/or electronic device 500 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for populating a field in a form performed by a computer, comprising:
   receiving a fillable form based on a description of a physical document, wherein the physical document comprises a set of fields, and wherein the fillable form comprises a fillable field for each field in the set of fields;
   sending a template of the set of fields to be displayed to a user on a portable electronic device that is remotely located from the computer;
   sending a unique prompt, for each field in the set of fields, to be displayed to the user at the portable electronic device, wherein each unique prompt displayed to the user requests the user to capture an image, based on the displayed template, of a region of the physical document that includes the field and data that appears in the field corresponding to that unique prompt;
   receiving, for each of the one or more fields, the image of the region of the physical document that includes the field and data that appears in the field;
   extracting, for each received image, the data that appears in the field from the image of the region; and
   populating the extracted data into the fillable field in the fillable form that corresponds to the field from the image of the region of the physical document.

2. The method of claim 1, wherein the physical document includes an income-tax form.

3. The method of claim 1, wherein the physical document includes a form having a format specified by a government agency.

4. The method of claim 1, wherein the image includes a digital photograph.

5. The method of claim 1, wherein the image includes multiple fields; and
   wherein the extracting involves:
      capturing a set of information associated with the multiple fields;
      identifying the field based on a description proximate to the field; and
      selecting a subset of the set of information that includes the data.

6. The method of claim 5, wherein, if the computer is unable to identify the field, the method further includes prompting the user to identify the field from the multiple fields.

7. The method of claim 1, wherein the image includes a real-time video stream provided by the portable electronic device.

8. The method of claim 1, wherein extracting the data involves performing optical character recognition using the image of the region.

9. The method of claim 8, wherein the optical character recognition includes a radial image analysis technique that identifies a boundary of the field in the region.

10. The method of claim 1,
further comprising using the image of the region to determine a next field in the set of fields to prompt the user to take an image of, wherein using the image of the region comprises determining that the image of the region does not include an image of the next field;
wherein prompting the user comprises requesting that the user provide an image of a second region in the document that includes the next field;
wherein the method further comprises repeating the operations until images that include all the fields in the set of fields have been received from the user;
wherein receiving the image comprises receiving a different image for the field than images received for other fields in the set of fields, and wherein the region is smaller than a page of the document.

11. The method of claim 1, wherein, for each field in the set of fields, the physical document comprises a descriptor for the field and a monetary value for the field, and wherein the method is performed without the user entering any of the descriptors or any of the monetary values for any of the fields.

12. A computer-program product for use in conjunction with an electronic device, the computer-program product comprising a non-transitory computer-readable storage medium and a computer-program mechanism embedded therein to populate a field in a form, the computer-program mechanism including instructions for:
receiving, at a computer, a fillable form based on a description of a physical document, wherein the physical document comprises a set of fields, and wherein the fillable form comprises a fillable field for each field in the set of fields;
sending a template of the set of fields to be displayed to a user on a portable electronic device that is remotely located from the computer;
sending a unique prompt, for each field in the set of fields, to be displayed to the user at the portable electronic device, wherein each unique prompt displayed to the user requests the user to capture an image, based on the displayed template, of a region of the physical document that includes the field and data that appears in the field corresponding to that unique prompt;
receiving, from the portable electronic device, for each of the one or more fields, the image of the region of the physical document that includes the field and data that appears in the field;
extracting, for each received image, the data that appears in the field from the image of the region; and
populating the extracted data into the fillable field in the fillable form that corresponds to the field from the image of the region of the physical document.

13. The computer-program product of claim 12, wherein the physical document includes a form having a format specified by a government agency.

14. The computer-program product of claim 12, wherein the image includes multiple fields; and
wherein the instructions for extracting involve:
capturing a set of information associated with the multiple fields;
identifying the field based on a description proximate to the field; and
selecting a subset of the set of information that includes the data.

15. An electronic device, comprising:
a processor;
memory; and
a program module, wherein the program module is stored in the memory and configurable to be executed by the processor to populate a field in a form, the program module including instructions for:
receiving, at a computer, a fillable form based on a description of a physical document, wherein the physical document comprises a set of fields, and wherein the fillable form comprises a fillable field for each field in the set of fields;
sending a template of the set of fields to be displayed to a user on a portable electronic device that is remotely located from the computer;
sending a unique prompt, for each field in the set of fields, to be displayed to the user at the portable electronic device, wherein each unique prompt displayed to the user requests the user to capture an image, based on the displayed template, of a region of the physical document that includes the field and data that appears in the field corresponding to that unique prompt;
receiving, from the portable electronic device, for each of the one or more fields, the image of the region of the physical document that includes the field and data that appears in the field;
extracting, for each received image, the data that appears in the field from the image of the region; and
populating the extracted data into the fillable field in the fillable form that corresponds to the field from the image of the region of the physical document.

16. The method of claim 15, wherein the computer comprises a desktop or laptop computer, wherein the portable electronic device comprises a mobile phone with a camera, and wherein the user captures the image of the region by using the camera.

* * * * *